United States Patent

[11] 3,622,169

| [72] | Inventors | Roland G. Koch;<br>Allen E. Nickless, both of Frankenmuth, Mich. |
|---|---|---|
| [21] | Appl. No. | 856,263 |
| [22] | Filed | Sept. 9, 1969 |
| [45] | Patented | Nov. 23, 1971 |
| [73] | Assignee | Houdaille Industries, Inc.<br>Buffalo, N.Y. |

[54] QUICK-CHANGE TOOL HOLDER
20 Claims, 14 Drawing Figs.

[52] U.S. Cl. .................................................. 279/1 B, 279/89
[51] Int. Cl. .................................................. B23b 31/06
[50] Field of Search ........................................ 279/1 B, 89, 90, 91, 76, 75

[56] References Cited
UNITED STATES PATENTS

| 3,498,624 | 3/1970 | Hammond et al. ........... | 279/89 X |
| 3,512,793 | 5/1970 | Botimer ....................... | 279/91 |

FOREIGN PATENTS

| 316,967 | 1967 | Sweden ........................ | 279/75 |

Primary Examiner—William S. Lawson
Assistant Examiner—James F. Coan
Attorney—Hill, Sherman, Meroni, Gross & Simpson ABSTRACT: A quick-change tool holder comprises a rotatably drivable member having an axially outwardly opening socket receptive of a tool adapter stem with means for automatically locking the received stem in the socket, and adapter-releasing means including a part carried normally corotatively by the member and adapted for selective relative rotation thereon to effect release of the stem from the socket.

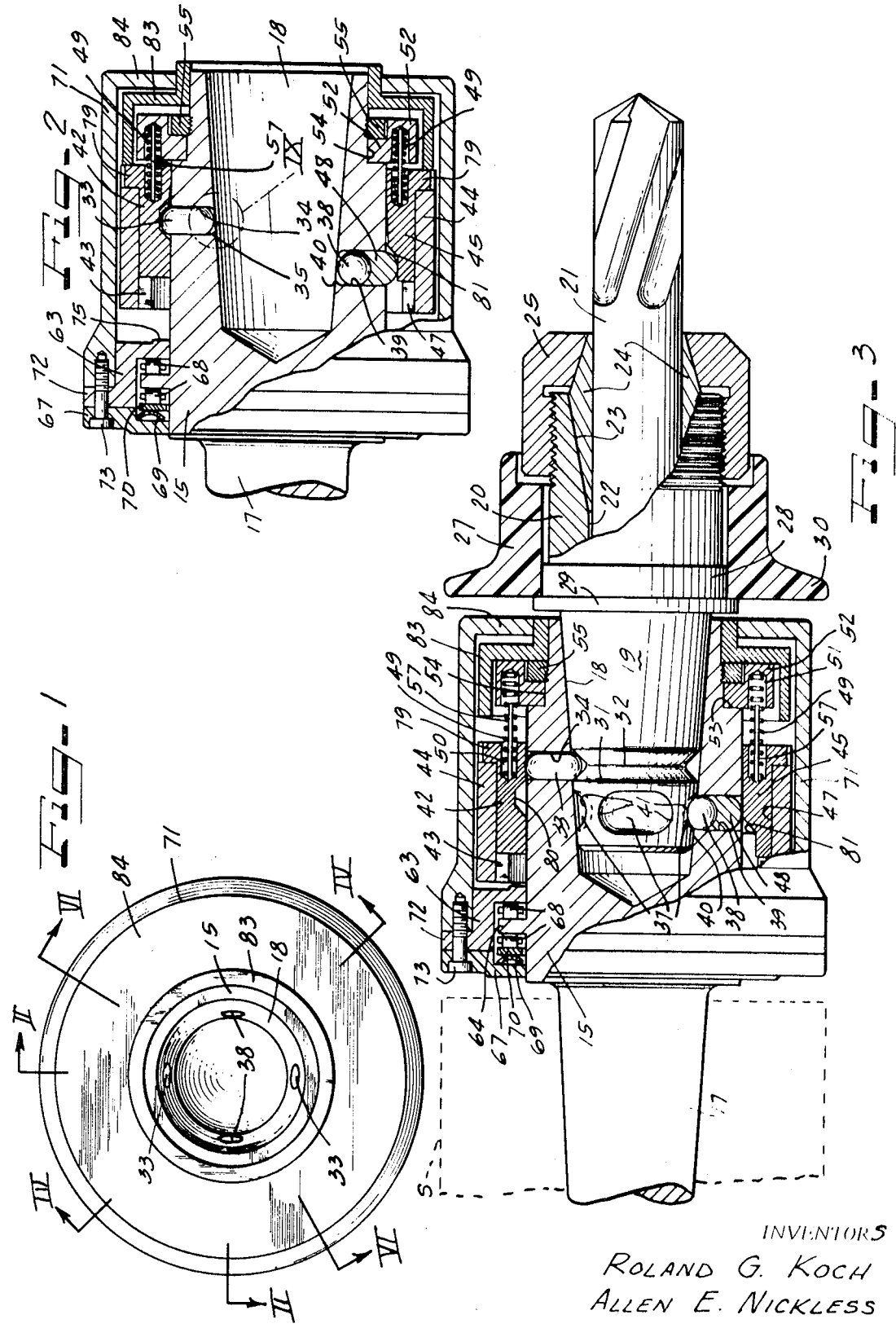

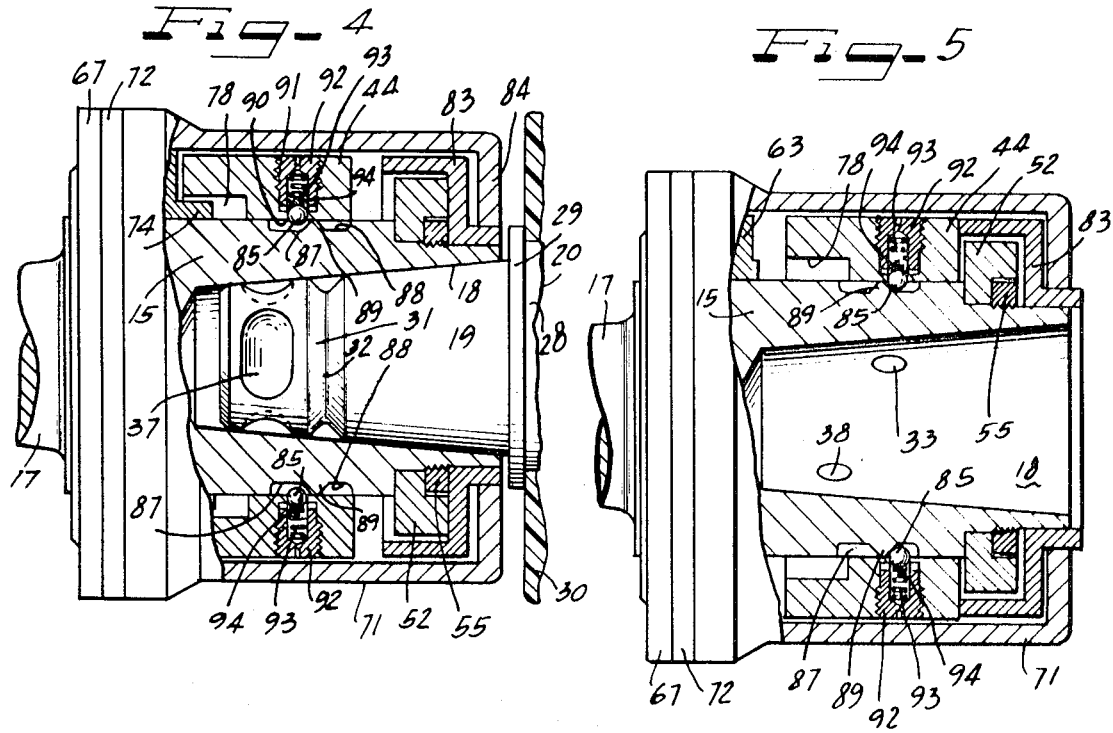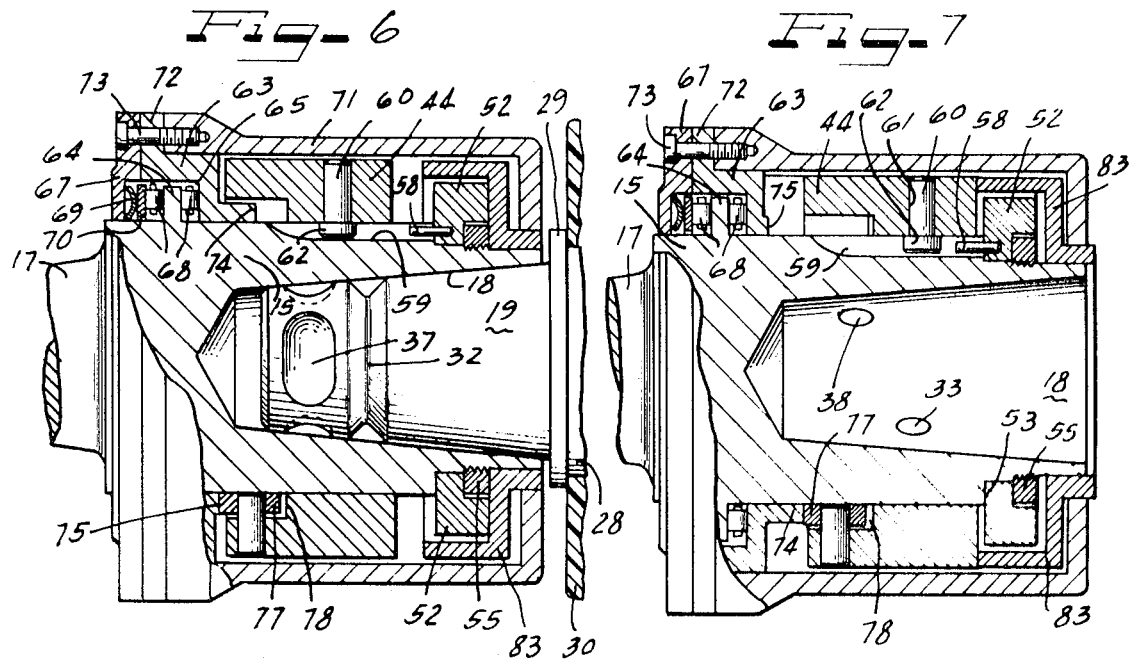

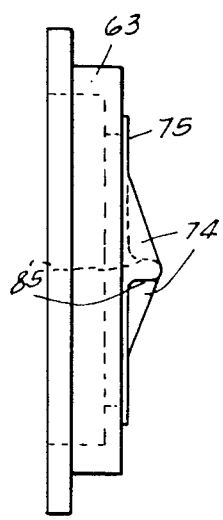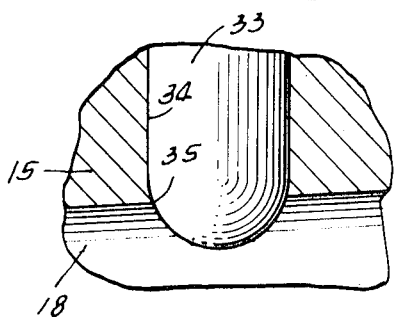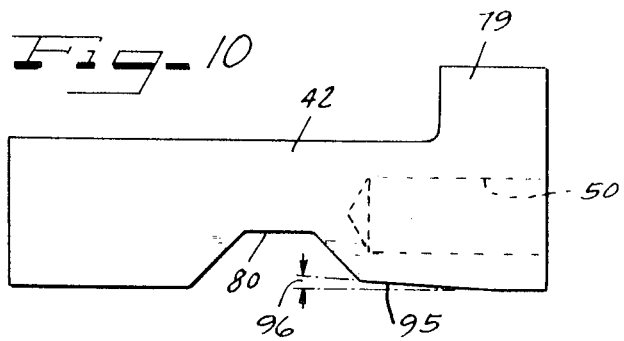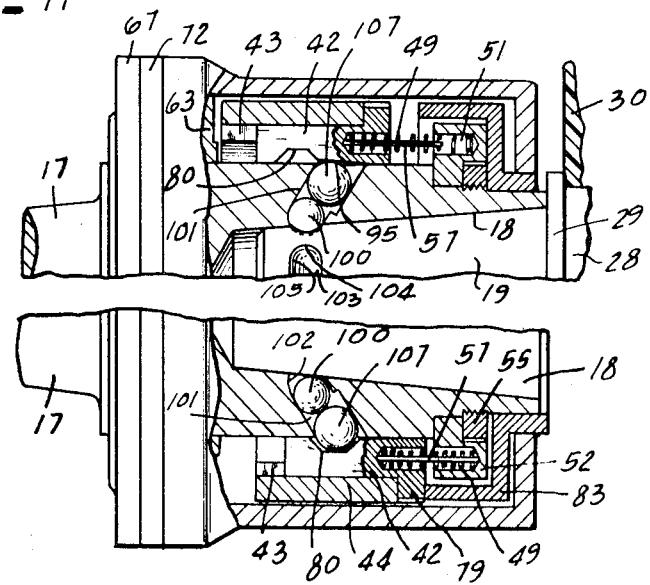

INVENTORS
ROLAND G. KOCH
ALLEN E. NICKLESS

ATTORNEYS

QUICK-CHANGE TOOL HOLDER

This invention relates to a quick-change tool holders and is more particularly concerned with such holders adapted for manual operation or for use with automatic tool changing mechanisms.

Prior tool holders have generally required the use of wrenches or other tool aids to effect tool changes, and even if provided with locking devices that can be digitally operated, it has been necessary to stop the machine tool spindle in order to effect a tool change.

According to the present invention the foregoing and other disadvantages shortcomings, inefficiencies and problems are overcome by means of quick-change tool holder construction in which a rotatably drivable member has an axially outwardly opening socket receptive of a tool adapter stem and has means for automatically locking the received stem in the socket, as well as adapter-releasing means including a part carried normally corotatively by the member and adapted for selective relative rotation thereon to effect release of the stem from the socket.

An important object of the invention is to provide a quick-change tool holder which not only has means to insure positive driving of the tool but affords rigidity and concentricity consistent with precision machine tool use, and permits changing from one tool to another without the use of wrenches or similar aids.

Another object of the invention is to provide a quick-change tool holder which will permit tool changes while the tool holder is rotating with a carrying spindle at normal operating speed.

A further object of the invention is to provide a new and improved quick-change tool holder equipped for automatically locking a tool adapter in place therewith.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is an end view of a tool holder embodying features of the invention;

FIG. 2 is a longitudinal sectional view, partially in elevation, taken substantially along the line II—II on FIG. 1;

FIG. 3 is a view similar to FIG. 2 but showing the same with a tool adapter locked in place therewith;

FIG. 4 is a longitudinal sectional view, partially in elevation, taken substantially along the line IV—IV on FIG. 1 showing the tool holder with the adapter in locked position;

FIG. 5 is a view similar to FIG. 4 but showing the tool holder in the open condition thereof;

FIG. 6 is a longitudinal sectional detail view, partially in elevation, taken substantially on the line VI—VI on FIG. 1, showing the took adapter locked in;

FIG. 7 is a view similar to FIG. 6 but showing the holder in open condition;

FIG. 8 is a side elevational view of the cam member employed in the tool holder;

FIG. 9 is an enlargement of the encircled portion of FIG. 2, identified at IX;

FIG. 10 is an enlarged elevational view of one of the locking wedges of the holder;

FIG. 11 is a fragmentary longitudinal sectional detail view, partially in elevation, similar to FIG. 3 but showing a modification;

FIG. 12 is a fragmentary longitudinal sectional detail view, partially in elevation, similar to FIG. 2 and showing the modified arrangement of FIG. 11 in the open condition of the holder;

Figure 13:
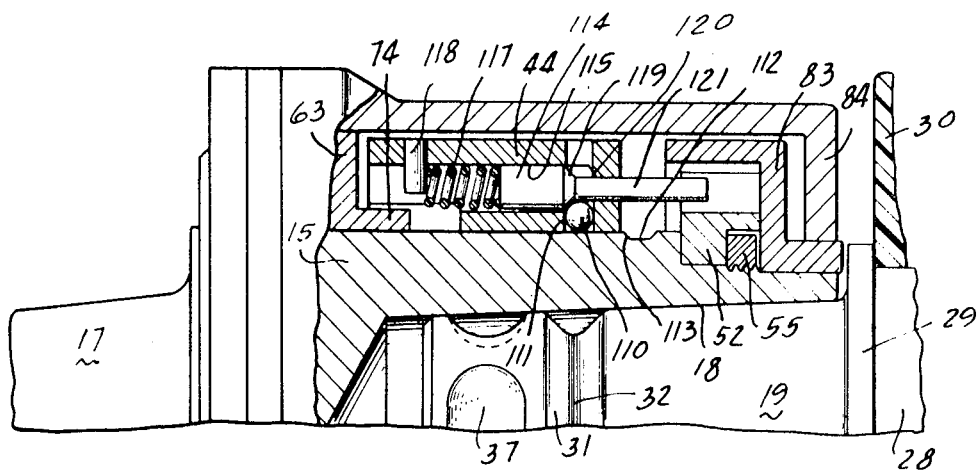
FIG. 13 is a fragmentary longitudinal sectional detail view, partially in elevation, similar to FIG. 4, but showing a further modification.

A tool holder according to the present invention comprises a solid body member 15 (FIGS. 1–3) having on one end an axial shank portion 17 which is of any appropriate configuration suitable for mounting in a selected machine spindle S, herein of a tapered form, but may be an integral part of a machine spindle, whereby the body is adapted to be driven rotatably. Coaxially within the body and opening outwardly from its opposite end, the body 15 has a socket 18, preferably of inwardly tapered and outwardly flaring form receptive in solid engagement therein of a complementary tapered shank portion 19 of a cylindrical tool adapter body 20.

Means are provided on the adapter 20 for receiving and supporting any of various specific tools. By way of example a drill bit 21 is illustrated as received in a socket 22 opening outwardly from the end of the holder opposite to the shank 19 and having at least its outer end portion provided with a flare taper 23 to receive chuck jaws 24 driven grippingly against the shank of the drill bit by means of a chuck ring nut 25 threaded onto the adapter body. For convenient manipulation of the tool adapter it is desirably provided with a collar 27 fixed or alternatively rotatably mounted on a slightly enlarged diameter shoulder 28 on the adapter body at the outer side of an annular radially extending flange 29 at juncture of the shank 19 with the adapter body. Although the collar 27 may be made of any preferred material, it is desirably formed from a suitable plastic material such as nylon with a smooth outer surface which may be grasped to assemble the adapter with the tool holder or to remove the adapter therefrom, with a lateral annular head flange 30 on the collar preventing slipping of the collar from the manipulating hand in a downward direction when lifting the adapter upwardly into position or when receiving the adapter as it drops out of the holder. By virtue of its smooth outer surface, the collar 27 enables handling of the adapter when it rotates with the tool holder during assembly with or removal from the holder.

Means are provided for automatically solidly locking the adapter shank 19 in the socket 18 as an incident to thrusting the shank home into the socket, and especially adapted for effecting such locking retention of the adapter shank and thus the adapter while the tool holder is running at full spindle speed. To this end, the shank 19 is locked against axial displacement from the socket 18 by engagement with a generally axially and radially outwardly facing interlock shoulder 31 in an annular groove 32 by the inner rounded ends of a diametrically opposite pair of detents 33 carried by the holder body 15 in suitable radial detent bores 34 opening into the socket 18 and through the perimeter of the holder body. At the mouth of the detent bore opening into the socket 18, in each instance, means are provided to prevent the respective detents 33 from escaping when the holder is open and free from the adapter shank, such means herein comprising a slight annular retainer constriction 35 (FIGS. 2 and 9). In addition, to retain the adapter shank 19 corotative with the body 15, a series of circumferentially elongated and aligned recesses 37 are provided in the shank 19, desirably between the groove 32 and the inner or free end of the shank to receive corotational locking detents 38 comprising a diametrically opposite pair in the form of balls located in respective radial detent bores 39. These ball detents 38 are permitted to project substantially into the socket 18 for locking purposes but are restrained against escaping from the bores 39 by suitable slight respective constrictions 40 about the inner mouth ends of the bores. Engagement of the ball detents 38 with stop shoulders 41 at the respectively opposite ends of the recesses 37 into which projected compel corotation of the shank 19 with the holder body 15 in either direction of rotation.

Means for maintaining the detents 33 in locking position comprise respective wedges 42 mounted in respective axial slots 43, aligned with the bores 34, in the inner perimeter of an annular carrier 44 which is relatively axially slidably mounted on and about the outer perimeter of the body 15 and encircling the area having the bores 34 and 39 opening therethrough. By having the locking detents 33 suitably elongated, rounded radially outer ends thereof are engaged by the wedges 42 to retain these detents in their locking position.

For maintaining the corotational locking detents 38 in their locking position, respective wedges 45 are mounted in respective axially extending slots 47 in the inner perimeter of the member 44 and aligned with the radially outer ends of the bores 39 for engaging the respective rounded outer ends of ball carriers or followers 48 mounted in the bores 39.

In the locking condition of the detents 33 and 38, the respective wedges 42 and 45 are yieldably thrust axially inwardly into retaining relation to the detents by biasing means comprising respective coiled compression springs 49 each having one end in an axially outwardly opening socket 50 in the adjacent end of the respective wedge member, and the opposite end of the spring seated in an aligned axially inwardly opening respective socket 51 in a base flange ring 52 engaged against an axially outwardly facing offsetting juncture shoulder 53 at the inner end of a reduced diameter or stepped-in external surface 54 on the end portion of the body 15 opposite to its stem or shank 17. Means such as a retaining ring nut 55 threaded onto the reduced diameter portion 54 clampingly secures the flange member 52 in place. A respective loose antibuckling pin or rod 57 is located in each of the springs 49.

Means are provided for assembly indexing the carrier 44 and the ring 52 and maintaining them positively against torque displacement relative to, but corotational with, one another and the holder body 15 as well as assuring constant axial alignment of the spring sockets 50 and 51 with one another and radial alignment of the wedges 42 and 45 with their respective dents. For this purpose, the ring 52 carries rigidly on its inner margin an axially inwardly projecting pin 58 (FIGS. 6 and 7) extending into an axial anchoring slot 59 of substantial length in the outer perimeter of the member 15 and opening through the shoulder 53. On the carrier 44 a pin 60 extending radially in and from a bore 61 carries on its inner end a roller 62 engaged in the slot 59 and permitting axial relative movement of the carrier on the holder body.

For releasing the adapter from the holder, even while the holder is rotating at normal operating speed with the driving spindle, means are provided on the exterior of the holder which may be manually or mechanically engaged to effect backing off of the detent locking wedges 42 and 45 and inactivate the detents 33 and 38. For this purpose an annular cam member 63 (FIGS. 3, 6, 7, and 8) is mounted in relatively rotatable relation on and about a cylindrical head end portion of the holder body 15 adjacent to the shank 17 but is normally held against relative rotation in a manner requiring a positive manual or mechanical turning thereof relative to the holder body 15 or holding of the cam while the holder body continues rotation with the machine spindle. In a desirable arrangement, the cam member 63 is held in the desired axial relation to the holder body 15 in a manner to permit selective relative turning thereof by means of an annular radially outwardly extending flange 64 integral with the body 15 and received freely within a rabbet groove 65 opening inwardly and outwardly in the cam member and across the outer end of which is secured an annular end cap or retainer 67. Within the annular cavity thus provided in the cam member, antifriction means desirably of the form of roller bearings 68 are interposed between the flange 64 and the cam member 63 on one side and the retainer 67 on the other side, with a wave spring 69 disposed between the retainer 67 and a thrust washer 70 riding against the adjacent set of bearings 68 to exert a predetermined axial preload on the bearings to restrain free relative rotary movement of the cam member 63 with respect to the body 15 but permitting relative rotation when the cam member is manipulated for that purpose. To facilitate such relative rotation either manually or mechanically, means are provided in the form of a sleeve 71 secured to the cam member through a radially outwardly extending annular flange 72 thereon as by means of screws 73 which also secure the retainer 67 to the cam member. In this instance, the sleeve 71 serves also as a mechanism housing within which the elements of the holder externally on the body 15 are protectively housed.

When it is desired to release the tool adapter from the holder, the cam member 63 is caused to rotate relative to the body 15 as by manipulation of the housing sleeve 71 to turn the cam relative to the housing where the adapter is stationary relative to the machine spindle or has been detached from the spindle, or by holding the cam against rotation with the holder body 15 where the holder is rotating with the spindle. Thereupon, axially inwardly projecting diametrically opposite cam lobes 74 which have cam surfaces sloping from a cam track 75 are advanced toward or are held for running thereonto of diametrically opposite pair of followers comprising rollers 77 mounted in a cam-lobe-clearing annular rabbet groove 78 in the adjacent end of the carrier 44 (FIGS. 6 and 7). These rollers 77 are adapted to ride the cam track 75 when the locking wedges 42 and 45 are in their spring biased detent-locking position wherein respective radially outwardly projecting heels 79 on the outer end portions of the wedges thrust against confronting end shoulder areas of the carrier ring 44 and thereby thrust it toward the cam member.

As the rollers 77 ride onto the cam lobes 74, the carrier 44 thrusts against the shoulder heels 79 and drives the wedges 42 and 45 against the bias of the springs 49 until the detents 33 are released into respective release notches or recesses 80 in their associated wedges 42, and the detents 38 are released by movement into alignment therewith of a respective cutback clearance 81 in the associated wedges 45. Either centrifugal force or camming action of the respective groove surfaces on the shank 19 thereagainst causes the detents to back off from their locking position to release the adapter shank 19 for displacement of the adapter from the holder. Any tendency of the adapter shank 19 to stick in the socket 18 is overcome by a positive thrust against the adapter incident to the unlocking operation of the carrier 44 which at its wedge shouldering end thrusts against an ejector 83 which is desirably in the form of an annulus of generally Z-shaped in axial cross section such that its inner end confronts the end of the carrier 44 while its outer end confronts the collar flange 29 on the adapter, with a sufficient range of movement permitted between the outer end of the flange 52 and the inner surface of a radially inwardly extending annular housing flange 84 to enable positive ejecting thrust against the flange 29 when the carrier 44 is fully shifted to detent-releasing position by action of the cam lobes 74.

After the follower rollers 77 have reached the peaks of the cam lobes 74, only slight further relative rotation of the cam relative to the holder body 15 in the unlocking direction moves the cam lobes from the follower rollers whereby the cam is, in effect, cleared from the followers to enable relocking of the adapter or a replacement adapter in association with the holder. It may be noted that when such relocking relationship is resumed, there can be no unlocking by reverse movement of the cam, by reason of abrupt abutments 85 on the reverse ends of the cam lobes, thus compelling unlocking to be achieved by the relative rotation of the cam and holder body in one direction only.

As the carrier 44 reaches the detent-unlocking position by action of the cam lobes 74, it is automatically latched in the unlocked position, in opposition to the bias of the springs 49. To this end, the carrier 44 carries at diametrically opposite sides thereof, circumferentially spaced from and between the wedge grooves 43 and 47, latching detent means in the form of balls 85 (FIGS. 4 and 5) which normally project slightly less than half their circumference from the inner perimeter of the carrier ring into respective clearance recesses 87 in the confronting outer perimeter surface of the holder body 15 in the locking position of the carrier 44, and into axially spaced respective clearance recesses 88 in the body periphery alongside respective latching detent shoulders 89 at the separation between the recesses. Suitable oblique lead-in surfaces are provided on the shoulder divider to facilitate movement of the detents 85 thereby under axial thrusting pressure applied to the carrier 44. An apertured seat 90 is provided for each of the detents 85, which may be on the order of the seat restriction 35 depicted in FIG. 9 and located at the inner end of a bore 91, in each instance, having a larger diameter opening from the outer perimeter of the carrier 44 and into which is threadedly engaged a generally cup-shaped spring-loading retainer 92 thrusting a coiled compression biasing spring 93 against a plunger 94 bearing against the associated detent 85. The bias thrust load on the detents 85 is sufficient to resist return of the carrier 44 from the latched position as shown in FIG. 5 under the influence of the biasing springs 49, whereby to maintain the holder open and ready to receive an adapter shaft to be locked therein. Desirably the length of the ejector 83 is such that in the open holder latched position of the carrier 44 its outer end retains the ejector with its outer end projecting a sufficient distance axially outwardly relative to the housing flange 84 to be in the path of and therefore serve as a trip when engaged by the collar flange 29 of the adapter to shift the carrier 44 sufficiently axially inwardly to release the latching detents 85 from their latching shoulders 89 to effect locking of the locking detents 33 and 38 as the shank 19 seats within the socket 18. Through this arrangement, not only is the holder operated to release an adapter shank therefrom but is automatically, in effect, cocked for automatic locking of the replaced adapter shank. Both locking and unlocking of the holder are effected without need for any special tools and can be effected without stopping the holder from running at normal or at least continuous machine spindle speed. Where the machine spindle has high speed and low speed capabilities, it will, of course, be more convenient to effect the adapter locking and unlocking maneuvers at the lower speed, although these maneuvers may be effected at any speed. It will be appreciated that this unusual capability is of substantial advantage in high speed production equipment.

In order to assure a firm, tight locking grip of the detents 33 with the shoulder 31 of the adapter shank in the automatic locking action of the holder mechanism, it may be noted that the edges of the wedges 42 which engage the detents 33 lockingly are provided with respective cam surfaces 95 (FIG. 10) leading from the clearance notches 80. The angle of inclination of the cam edge 95 may be on the order of 3° or 4° and will result in an efficient force vector assuring a solid drawing of the shank 19 into the socket 18 as the springs 49 thrust the wedges 42 in the locking direction.

In the modification of FIGS. 11 and 12, all features of the holder and the adapter are identical with the FIG. 1 form which has been described immediately hereinbefore, with the exception that the separate functions of the locking detents 33 and 38 are combined in detents 100 of which there are at least two at diametrically opposite sides of the socket 18. Each of the detents 100 is in the form of a ball which is adapted in its locking position to project partially from a generally radially and axially inwardly oblique bore 101 and retained against escape in the free state from the bore by a seating restriction 102. In locking position, the detent 100 is received in a recess 103 in the shank 19 similar to the recesses 37 but desirably narrower and provided not only with antirotation stop shoulders 104 at the circumferentially opposite ends but also with an axial displacement preventing shoulder 105 at the axially inner side of the recess, so that the detent will thrust against the shoulder 105 to effect a firm drawing in of the shank 19 into the socket 18 under locking thrust. Such thrust is applied through a booster ball 107 thrusting there against and normally projecting peripherally from the outer end of the bore 101 to be engaged lockingly by one of the wedges 42, and more particularly by the force vector cam edge 95 thereof under the bias of its associated spring 49. It may be observed that by having the wedges 42 slidably mounted in their grooves 43 a slight takeup allowance may be made initially in the cam surface 95 so that assurance of positive thrusting action on the locking detent structure is maintained throughout the life of the holder. When the carrier 44 is backed off by cam action, as described hereinbefore, the booster ball 107 is free to drop into the clearance recess or notch 80 of its associated wedge member 42 to unlock the detent ball 100 from the shaft recess 103 and thereby enable removal of the adapter.

Figure 14:
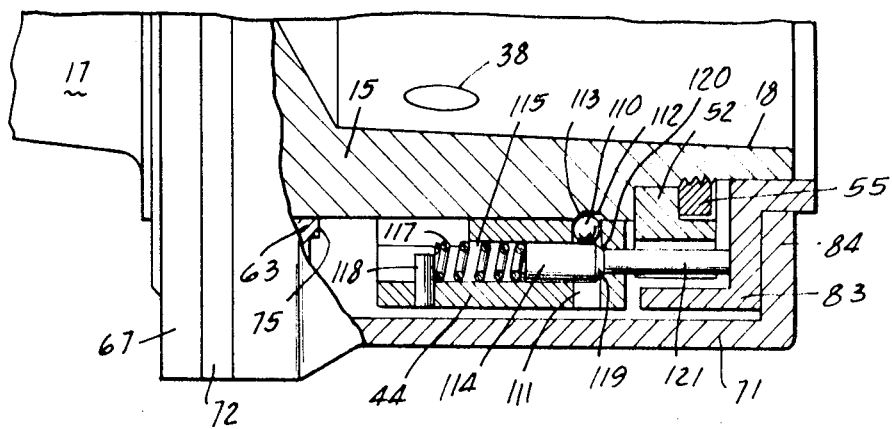
FIG. 14 is a view similar to FIG. 13, but showing the holder in open condition.

In FIGS. 13 and 14 is shown a modification of means for latching the carrier 44 in the unlocked and cocked or ready position and which means may be employed instead of the latching means illustrated in FIGS. 4 and 5. Aside from this modified latching means, details of the holder and tool adapter may be the same as described hereinbefore. In this instance, a plurality of latching detent balls 110 are mounted in relatively freely reciprocal relation in the radially inner ends of transverse mounting bores in the axially outer end portion of the reciprocable carrier 44, with the balls arranged to ride on the confronting perimeter of the holder body 15 in the adapter locking relationship of the parts, as shown in FIG. 13. In the open holder relationship of the parts the latching ball detents 110 are operative to latch the carrier 44 by engagement of the balls in respective shallow recesses 112 in the perimeter of the body 15 adjacent to the base ring 52 and defined on their axially inner side by respective shoulders 113 against which the balls are latchingly engageable to retain the carrier in the open holder, ready position.

Means for locking the detent balls 110 in their latching position against the shoulder 113 comprise a locking plunger 114 reciprocably mounted in a longitudinal bore 115 intersecting the bore 111 in the carrier 44. Biasing means comprising a coiled compression spring 117 acts on the axially inner end of the locking plunger 114 to thrust it normally axially outwardly toward locking position, a thrust pin 118 providing a compression seat for the opposite end of the spring. To limit axially outward movement of the plunger 114, a frustoconical stop shoulder 119 thereon facing generally axially outwardly is adapted to engage a seat 120 at the axially outer side of the bore 111.

Release of the latching detent balls 110 from the shoulders 113 is effected through the ejector/trip member 83 against which the free end of a reduced diameter axially outward extension 121 on the plunger 114 is adapted to engage in the ready or open holder condition of the mechanism, with a suitable clearance between the inner end of the member 83 and the confronting end of the carrier 44 to enable sufficient axially inward movement of the member 83 by thrust of the collar flange 29 of the tool adapter during assembly of the adapter with the holder to enable axially inward movement of the latch plunger to move the shoulder 119 beyond center of the latch ball 110 in each instance to enable retraction of the latch balls in the continued axially inward movement of the member 83 into thrusting engagement with the confronting end of the carrier 44 to effect retraction of the latching detents 110 by camming radially outwardly along the slope provided therefore on the shoulder 113. There upon the latching detents 110 engage the respective shoulder 119 of the plunger and as the carrier biasing springs snap the released carrier 44 to the axially inward adapter shank locking position the balls 110 ride on the perimeter of the body 15.

We claim as our invention:

1. A quick-change tool holder comprising:
   a rotatably drivable member having an axially outwardly opening socket receptive of a tool adapter shank and provided with openings thereinto;
   locking detents operative in and through said openings;
   means for latching said detents in a shank-locking relationship comprising wedge elements carried by a carrier reciprocably mounted on said member to enable longitudinal reciprocation of the elements relative to said member;
   means normally biasing said carrier in one reciprocal direction to effect a latching relation of said wedge elements to said detents;
   adapter-releasing means including a part carried normally corotatively by said member for selective relative rotation thereon and comprising a cam operative in said relative rotation to act on follower means on said carrier to drive said carrier in opposition to said biasing means to release the wedge elements from said detents; and bearing means mounting said part and including loading means effecting restraint against unintentional relative rotation of said part and said member but enabling intentional relative rotation.

2. A quick-change tool holder comprising:

a rotatably drivable member having an axially outwardly opening socket receptive of a tool adapter shank and provided with openings thereinto;

locking detents operative in and through said openings;

means for latching said detents in a shank-locking relationship comprising wedge elements carried by a carrier reciprocably mounted on said member to enable longitudinal reciprocation of the elements relative to said member;

means normally biasing said carrier in one reciprocal direction to effect a latching relation of said wedge elements to said detents;

adapter-releasing means including a part carried normally corotatively by said member for selective relative rotation thereon and comprising a cam operative in said relative rotation to act on follower means on said carrier to drive said carrier in opposition to said biasing means to release the wedge elements from said detents;

releaseable latching means for holding said carrier in the wedge-releasing relation; and tool adapter motivated trip operative to release the latching means comprising a part which acts as a tool adapter ejector in response to operation of said cam part.

3. A holder according to claim 2, wherein said carrier serves as a transmission piece between said ejector and said cam part.

4. A holder according to claim 3, said ejector comprising a ring-shaped member having a flange engageable with the tool adapter and a flange engageable with the carrier.

5. A quick-change tool holder comprising:

a rotatably drivable member having an axially outwardly opening socket receptive of a tool adapter shank and provided with openings thereinto;

locking detents operative in and through said openings;

means for latching said detents in a shank-locking relationship comprising wedge elements carried by a carrier reciprocably mounted on said member to enable longitudinal reciprocation of the elements relative to said member;

means normally biasing said carrier in one reciprocal direction to effect a latching relation of said wedge elements to said detents;

adapter-releasing means including a part carried normally corotatively by said member for selective relative rotation thereon and comprising a cam operative in said relative rotation to act on follower means on said carrier to drive said carrier in opposition to said biasing means to release the wedge elements from said detents;

releaseable latching means for holding said carrier in the wedge- releasing relation comprising a ball detent carried by said carrier and a shoulder on said member;

detent locking plunger means for locking said latching ball detent in the latching relationship; and tool adapter motivated trip means operative to release said plunger means.

6. A quick-change tool holder comprising:

a rotatably drivable member having an axially outwardly opening socket receptive of a tool adapter shank;

means carried by said member for automatically locking the received shank in said socket;

adapter-releasing means including a part carried normally corotatively by said member and adapted for selective relative rotation thereon to inactivate said locking means and effect release of the shank from said socket; and a member carried by said rotatably drivable member for ejecting a tool adapter when its shank is released from said socket and also operative as a trip device when motivated by a tool adapter the shank of which is received in the socket to reactivate said locking means.

7. A holder according to claim 6, said carried member being of generally ring shape and having an axially extending flange engageable with the tool adapter and an oppositely axially extending flange operatively engageable with said locking means.

8. A holder according to claim 7, including a flange on said rotatably drivable member retainingly cooperating with said ring-shaped member.

9. A quick-change tool holder comprising:

a rotatably drivable member having an axially outwardly opening socket receptive of a tool adapter shank;

detent means carried by said member for releaseably locking the received shank in said socket;

a relatively reciprocable element carried by said member having means operable in one relative reciprocal position of the element on the member to retain said detent means in shank-locking position and in an opposite reciprocal position of the element to release said detent means from the locking position thereof;

means adapted to be actuated by an adapter when its shank is received in said socket to drive said element into said one reciprocal position; and adapter-releasing means including a part carried normally corotatively by said member and adapted for selective relative rotation thereon, said part having means operative when said part is rotated relative to said member to drive said element to said opposite reciprocal position to thereby inactivate said detent means for release of the shank from said socket.

10. A tool holder according to claim 9, said member having an opening into said socket, said detent means being operative in and through said opening, said retaining means comprising a lost motion wedge member carried by said element, and means normally biasing said wedge member into detent means retaining orientation on said element.

11. A holder according to claim 9, wherein said detent means comprise a plurality of detents, and a plurality of wedge members carried by said element in operative relation to said detents.

12. A device according to claim 9, including means normally biasing said element toward said part and away from said means adapted to be actuated by an adapter.

13. A holder according to claim 9, including releaseable latching means carried by said element and engageable with means on said member for holding said element in said opposite reciprocable position until released by said means adapted to be actuated by the adapter.

14. A holder according to claim 13, wherein said latching means comprise spring biased detents and said means on the member comprise respective detent shoulders.

15. A holder according to claim 13, in which said means on the holder comprises a shoulder, and said latching means comprise a detent and a spring-biased plunger normally operative to drive said detent into latching position, said plunger being releaseable by action of said means adapted to be actuated by an adapter.

16. A quick-change tool holder comprising:

a rotatably drivable member having an axially outwardly opening socket receptive of a tool adapter shank;

means carried by said member for releaseably locking a received shank in said socket;

an axially relatively reciprocable element carried by said member for controlling said locking means;

adapter-releasing means including a part carried normally corotatively by said member and adapted for selective relative rotation thereon;

said part having cam structure thereon projecting in the direction of opening of said socket; and follower means on said element engageable by the cam structure to drive said element into a reciprocal position toward said socket opening for releasing said locking means.

17. A holder according to claim 16, in which said part includes a sleeve member, and means cooperatively related to said ring and to said drivable member maintaining said sleeve member in normally corotational relation to said drivable member.

18. In combination with a tool adapter including a shank and a quick-change tool holder including a rotatably drivable member having an axially outwardly opening socket within which the adapter shank is received:
  said shank having both circumferentially facing and axially facing shoulders thereon;
  releaseable detent means carried by said member and operable through a wall defining said socket to engage with said shoulders and operative in such engagement to lock the shank both against separation from said socket and against relative rotation in said socket;
  first means carried by said member operable to effect automatic locking of said detent means with said shoulders incident to insertion of the shank into said socket; and
  second means carried by said member and adapted for selective relative rotation on the member to act on said first means to effect release of said detent means from said shoulders to unlock the shank for release from said socket.

19. A combination according to claim 18, said first means comprising a ring member corotatively connected to said drivable member and relatively axially reciprocable thereon between a position for locking the detent means and a position wherein the detent means are released, means activated by said tool holder for moving said ring member to the detent means locking position, and cam means on said second means operable when the second means is rotated to drive said ring member into the detent means releasing position.

20. In combination with a tool adapter including a shank and a quick-change tool holder including a rotatably drivable member having an axially outwardly opening socket within which the adapter shank is received:
  means carried by said member for automatically locking the shank in said socket incident to inserting the shank into the socket while the member is in driven rotation;
  said adapter having thereon a collar provided with a smooth surface and a protective lateral annular head flange and adapted for safe manual handling of the adapter for assembly of the shank into the socket during said rotation of the driven member and combination trip and ejector means operative between said locking means and said adapter axially inwardly relative to said collar.

* * * * *

UNITED STATES PATENT OFFICE
CERTIFICATE OF CORRECTION

Patent No. 3,622,169          Dated November 23, 1971

Inventor(s)     Roland G. Koch, et al

It is certified that error appears in the above-identified patent and that said Letters Patent are hereby corrected as shown below:

Column 7, line 29, after "trip" read --means--;
    Column 9, line 6, after "," (comma) read --said cam structure includes a ring member secured to said sleeve member,--.

Signed and sealed this 11th day of July 1972.

(SEAL)
Attest:

EDWARD M. FLETCHER, JR.          ROBERT GOTTSCHALK
Attesting Officer                 Commissioner of Patents